United States Patent
Bhagwat

(10) Patent No.: US 10,594,367 B1
(45) Date of Patent: Mar. 17, 2020

(54) POWER OVER DATA LINES SYSTEM WITH ACCURATE AND SIMPLIFIED CABLE RESISTANCE SENSING

(71) Applicant: Linear Technology Holding LLC, Wilmington, DE (US)

(72) Inventor: Gitesh Bhagwat, Santa Barbara, CA (US)

(73) Assignee: Linear Technology Holding LLC, Wilmington, DE (US)

( * ) Notice: Subject to any disclaimer, the term of this patent is extended or adjusted under 35 U.S.C. 154(b) by 0 days.

(21) Appl. No.: 16/518,683

(22) Filed: Jul. 22, 2019

Related U.S. Application Data

(60) Provisional application No. 62/756,749, filed on Nov. 7, 2018, provisional application No. 62/769,460, filed on Nov. 19, 2018.

(51) Int. Cl.
*H04B 3/54* (2006.01)
*H04L 12/10* (2006.01)
*H02J 1/00* (2006.01)

(52) U.S. Cl.
CPC ............... *H04B 3/54* (2013.01); *H02J 1/00* (2013.01); *H04L 12/10* (2013.01)

(58) Field of Classification Search
CPC ............ H04B 3/54–542; H04B 3/02; H04B 2203/5491; H02J 1/00; H04L 12/10; H04L 25/02–0298; H05B 33/0809; H05B 33/0857

See application file for complete search history.

(56) References Cited

U.S. PATENT DOCUMENTS

| | | | | |
|---|---|---|---|---|
| 4,060,735 A | * | 11/1977 | Pascucci | H02J 13/0089 307/3 |
| 5,859,584 A | * | 1/1999 | Counsell | H02J 13/0003 340/12.33 |
| 5,929,749 A | * | 7/1999 | Slonim | H04B 3/54 307/11 |
| 6,553,076 B1 | * | 4/2003 | Huang | H04B 3/548 375/219 |
| 7,092,043 B2 | * | 8/2006 | Vorenkamp | H01F 17/0006 257/E27.046 |
| 7,180,951 B2 | * | 2/2007 | Chan | H04B 3/23 375/257 |
| 7,474,704 B2 | * | 1/2009 | Lum | H04L 12/10 375/257 |

(Continued)

*Primary Examiner* — James M Perez
(74) *Attorney, Agent, or Firm* — Patent Law Group; Brian D. Ogonowsky

(57) ABSTRACT

In a PoDL system, where DC power and differential data are supplied over the same conductors between a PSE and a PD, a low-power test is first performed to determine the conductor resistance. The PSE and PD are connected to the conductors via DC-coupling inductors that block the data signals. Such inductors have a DC resistance (DCR). To avoid the DCR of the PD inductors being included in the resistance test of the conductors and to avoid the requirement of additional pins for kelvin sensing, the PD includes a MOSFET switch connected across the conductors on the line-side of the PD inductors. The PSE applies a current pulse of a known value to one of the conductors while the MOSFET switch is temporarily closed. The PSE measures the resulting voltage across the wires and uses Ohm's law to more accurately calculate the resistance of the conductors.

21 Claims, 4 Drawing Sheets

(56) References Cited

U.S. PATENT DOCUMENTS

| | | | | |
|---|---|---|---|---|
| 7,711,967 B2* | 5/2010 | Woo | G06F 1/266 | 340/12.36 |
| 7,933,295 B2* | 4/2011 | Thi | H04B 3/23 | 370/352 |
| 7,986,729 B2* | 7/2011 | Kennedy | H04B 1/7172 | 375/142 |
| 8,217,527 B2* | 7/2012 | Diab | H04L 12/10 | 307/1 |
| 8,472,532 B2* | 6/2013 | Schley-May | H04B 3/02 | 375/257 |
| 8,526,483 B2* | 9/2013 | Choi | H04B 3/54 | 375/139 |
| 8,582,271 B2* | 11/2013 | Bertin | G06F 1/26 | 361/111 |
| 8,674,539 B1* | 3/2014 | Magin | H02J 13/0044 | 307/1 |
| 8,860,242 B1* | 10/2014 | Pruett | H02J 4/00 | 307/5 |
| 9,217,578 B2* | 12/2015 | Jo | H04B 3/548 | |
| 9,602,317 B1* | 3/2017 | Hailu | H04L 25/03885 | |
| 9,768,978 B2* | 9/2017 | Coenen | H04B 3/54 | |
| 9,899,833 B2* | 2/2018 | Box | H02J 1/00 | |
| 10,027,223 B1* | 7/2018 | Zhang | H02M 3/07 | |
| 10,135,626 B2* | 11/2018 | Pischl | H04L 12/10 | |
| 10,136,488 B1* | 11/2018 | Kwon | H05B 33/0845 | |
| 10,333,742 B1* | 6/2019 | Bhagwat | H03H 7/427 | |
| 10,382,216 B1* | 8/2019 | Bhagwat | H04B 3/548 | |
| 10,419,200 B2* | 9/2019 | Takahashi | H04L 25/38 | |
| 10,425,237 B1* | 9/2019 | Bhagwat | H04L 12/10 | |
| 10,461,809 B2* | 10/2019 | Merrick | H04B 3/542 | |
| 2003/0127997 A1* | 7/2003 | Shoji | H02M 7/53803 | 315/291 |
| 2006/0153307 A1* | 7/2006 | Brown | H04L 1/0002 | 375/257 |
| 2006/0238250 A1* | 10/2006 | Camagna | H03F 1/02 | 330/253 |
| 2007/0025452 A1* | 2/2007 | Schindler | H04B 3/44 | 375/257 |
| 2007/0087722 A1* | 4/2007 | Ichihara | H04B 3/54 | 455/343.1 |
| 2007/0208961 A1* | 9/2007 | Ghoshal | G06F 1/189 | 713/300 |
| 2007/0236853 A1* | 10/2007 | Crawley | H04L 12/10 | 361/119 |
| 2007/0260904 A1* | 11/2007 | Camagna | H04L 12/10 | 713/310 |
| 2008/0137759 A1* | 6/2008 | Cai | H04L 25/0266 | 375/257 |
| 2008/0165463 A1* | 7/2008 | Chan | H04B 3/542 | 361/93.1 |
| 2009/0327558 A1* | 12/2009 | Landry | G06F 13/4072 | 710/301 |
| 2010/0182024 A1* | 7/2010 | Yu | G01R 27/04 | 324/713 |
| 2014/0037077 A1* | 2/2014 | Marchetti | H04B 3/02 | 379/93.06 |
| 2014/0111180 A1* | 4/2014 | Vladan | H04L 12/413 | 323/312 |
| 2014/0136874 A1* | 5/2014 | Diab | G06F 1/28 | 713/340 |
| 2014/0139014 A1* | 5/2014 | Sontag | H04L 12/40045 | 307/1 |
| 2014/0258738 A1* | 9/2014 | Greenwalt | G06F 1/3206 | 713/300 |
| 2015/0312048 A1* | 10/2015 | Bodo | H02J 13/0062 | 713/300 |
| 2016/0064924 A1* | 3/2016 | Wiese | H04L 12/10 | 361/119 |
| 2016/0142217 A1* | 5/2016 | Gardner | G01R 31/024 | 307/1 |
| 2016/0187951 A1* | 6/2016 | Buckmeier | H04L 12/10 | 713/300 |
| 2016/0241406 A1* | 8/2016 | Darshan | H04L 12/10 | |
| 2016/0308683 A1* | 10/2016 | Pischl | H04L 12/10 | |
| 2017/0187472 A1* | 6/2017 | Chini | H04B 15/005 | |
| 2017/0237575 A1* | 8/2017 | Heath | H02J 3/12 | 307/1 |
| 2018/0024620 A1* | 1/2018 | Gardner | H04L 25/0282 | 713/323 |
| 2018/0076714 A1* | 3/2018 | Ono | H02M 3/28 | |
| 2018/0331854 A1* | 11/2018 | Nickel | H04L 12/10 | |
| 2019/0068385 A1* | 2/2019 | Gardner | H04L 12/10 | |
| 2019/0288862 A1* | 9/2019 | Bhagwat | H04L 12/10 | |
| 2019/0342123 A1* | 11/2019 | Bhagwat | H02M 1/44 | |
| 2019/0342124 A1* | 11/2019 | Bhagwat | H04B 3/56 | |

* cited by examiner

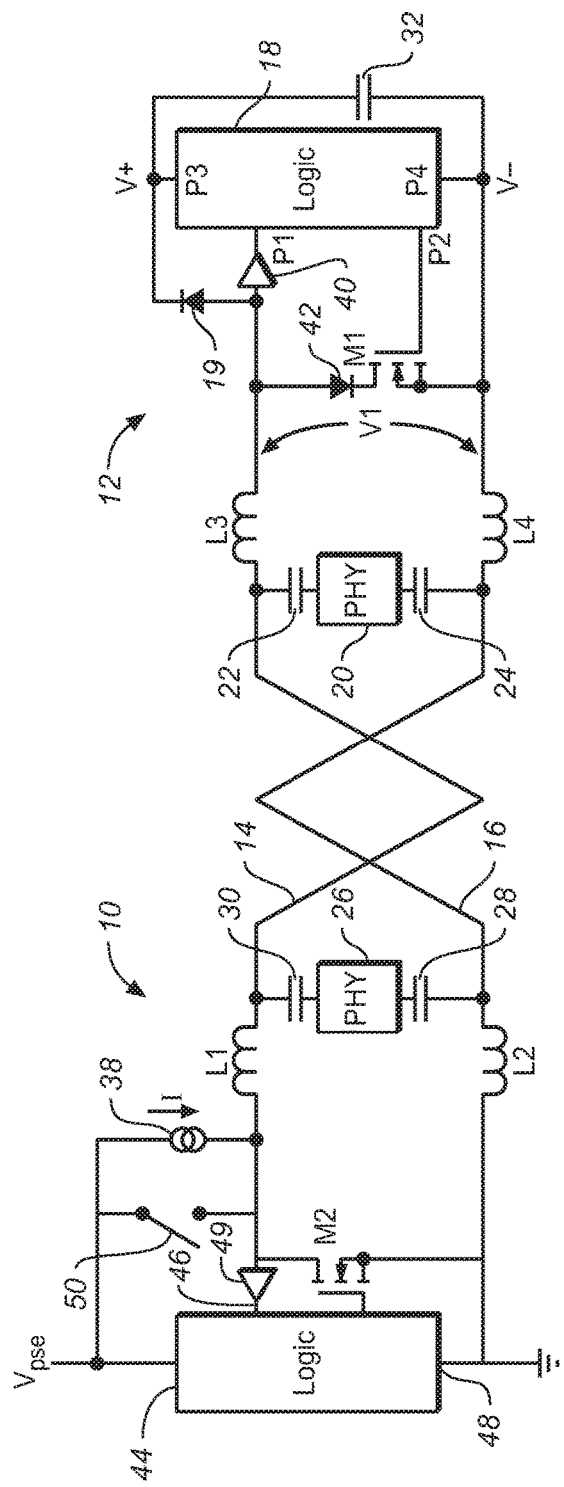
FIG. 1 *(PRIOR ART)*
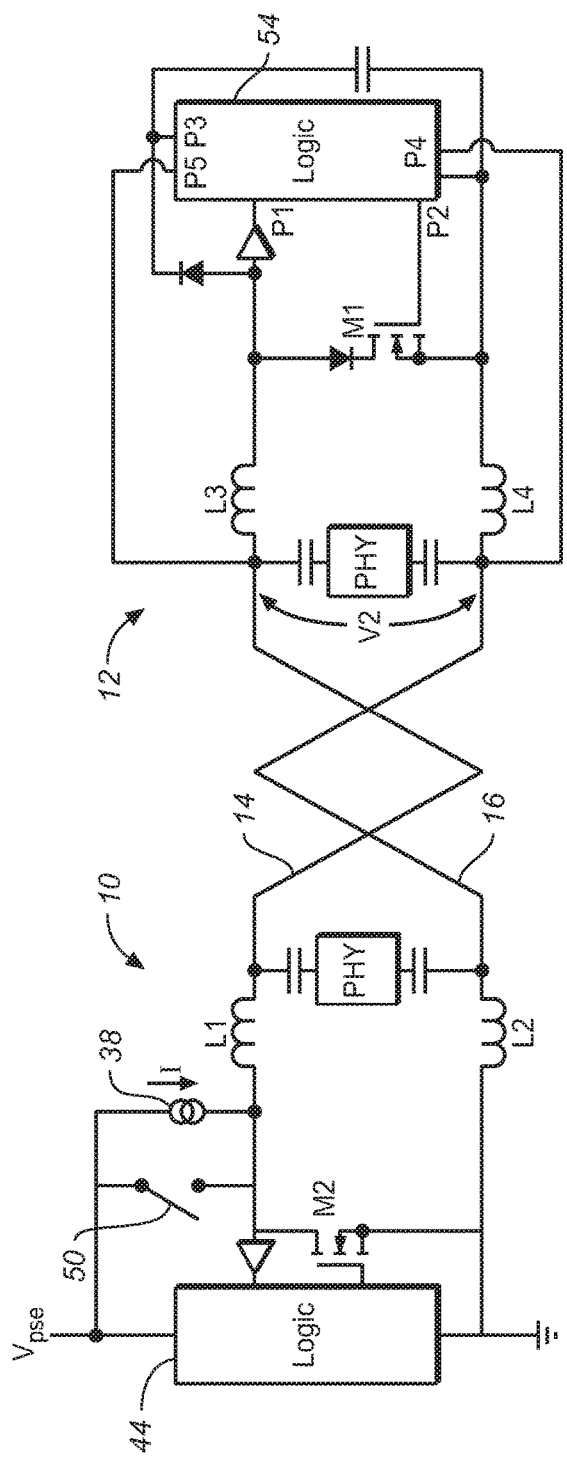
FIG. 2 *(PRIOR ART)*

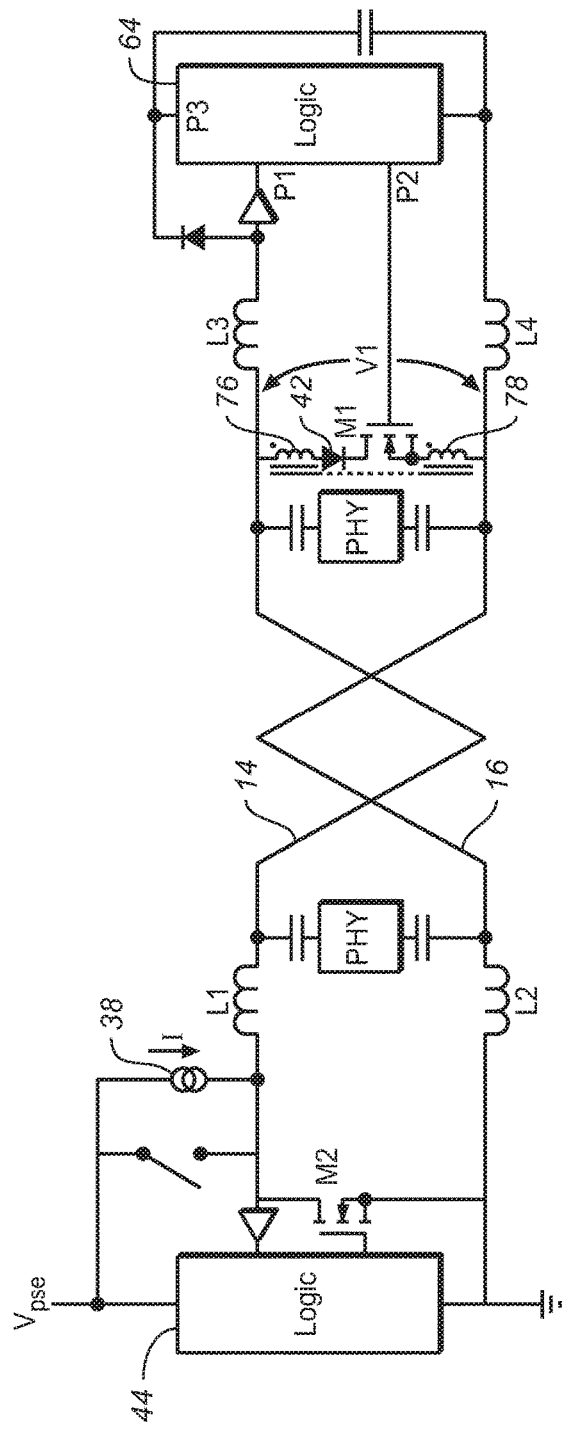
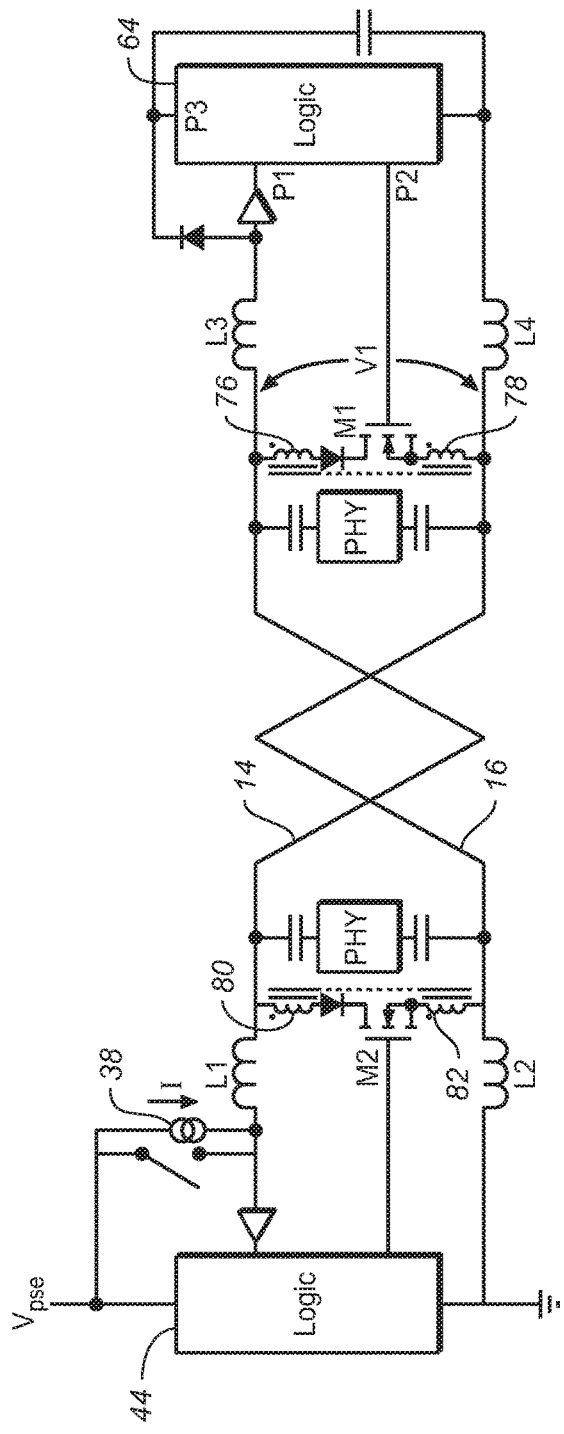
FIG. 5
FIG. 6

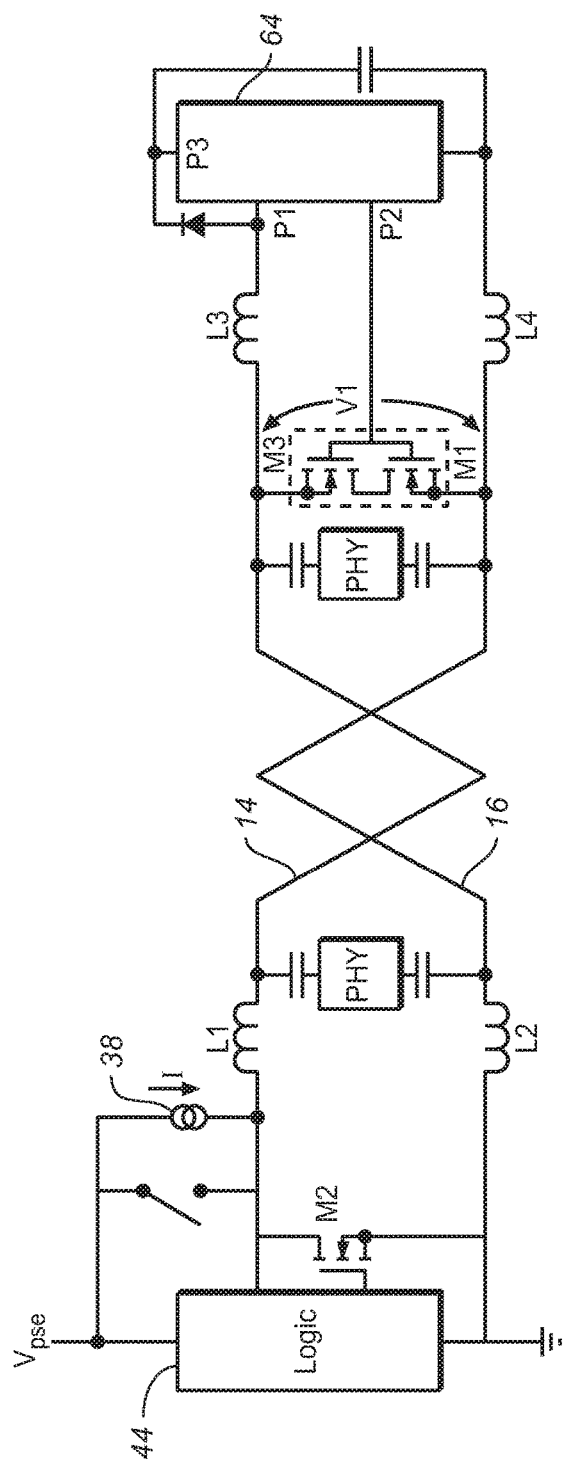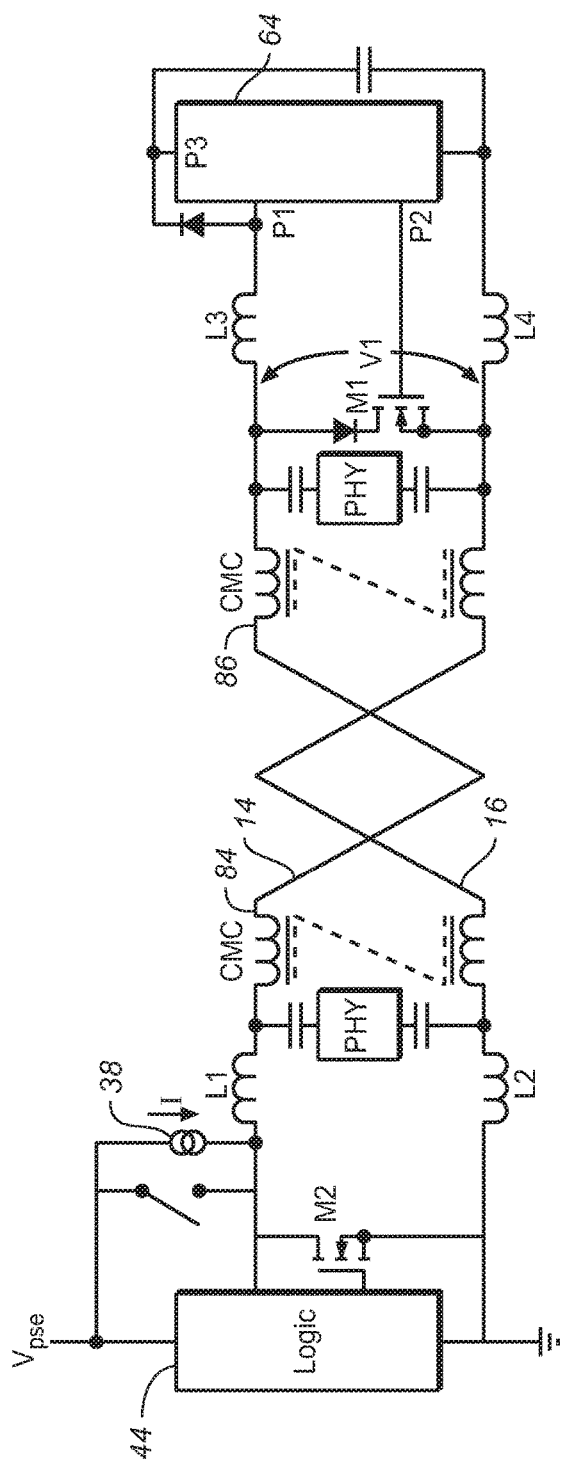
FIG. 7
FIG. 8

POWER OVER DATA LINES SYSTEM WITH ACCURATE AND SIMPLIFIED CABLE RESISTANCE SENSING

CROSS-REFERENCE TO RELATED APPLICATIONS

This application is based on and claims priority from U.S. Provisional Application Ser. No. 62/756,749, filed Nov. 7, 2018, and U.S. Provisional Application Ser. No. 62/769,460, filed Nov. 19, 2018, by Gitesh Bhagwat, incorporated herein by reference.

FIELD OF THE INVENTION

The invention relates to Power over Data Lines (PoDL) systems and similar systems, where DC power and data signals are provided over the same twisted wire pair or over a shielded cable, and, in particular, to techniques for more accurately measuring the resistance of the conductors between the Power Sourcing Equipment (PSE) and the Powered Device (PD).

BACKGROUND

One example of a PoDL system is referred to as a Class 14 system, where the wires between the PSE and PD can be 14 AWG (American Wire Gauge) and about 1000 meters in length. The IEEE specifies that the PSE must supply a minimum voltage of 50 VDC across the wires and supply a minimum power of 30 W. The maximum power that can be drawn by the PD is 20 W. Therefore, there is the assumption that the resistance of the wires (including all components in the power path between the PSE and PD) results in a loss of 10 W. This equates to a typical wire resistance of about 25 ohms.

However, if the wires used have a much lower resistance, such as if the wires are relatively short or a thicker gauge, there may be an actual power loss in the wires of, for example, only 1 W. Therefore, the PD can actually draw as high as 9 W more than the IEEE standard of 20 W (an almost 45% increase) without increasing the PSE power budget.

So, there is a benefit in knowing the actual wire resistance between the PSE and the PD if it is desired to maximize the allowable power drawn by the PD or have a more accurate PSE power budget. Knowing the actual wire resistance (and voltage drop) is also beneficial in systems where it is desired to deliver a precise voltage at the PD, which may obviate the need for a voltage regulator at the PD. Other benefits exist in knowing the actual wire resistance.

Two known techniques for approximately measuring the wire resistance between the PSE and PD are shown in FIGS. 1 and 2.

In FIG. 1, a PSE 10 supplies DC power to a PD 12 via the same wires 14 and 16 used to conduct Ethernet differential data. The PD load 18 receives the DC voltage at its pins P2 and P3 and may be any type of load, which includes logic circuitry. A blocking diode 19 ensures the voltage is the correct polarity and helps prevent reverse discharge of the charge storage capacitor 32. The supplied power also powers the PD's PHY 20, although the PHY 20 DC voltage input terminals are not shown for simplicity.

The PHY 20 outputs differential data and receives differential data via AC-coupling capacitors 22 and 24 coupled to wires 14 and 16 of a twisted wire pair. The PHY 20, in this example, represents the physical layer in the OSI model (Open Systems Interconnection model) and is a transceiver that typically includes signal conditioning and decoding circuitry for presenting bits to the next stage. The term PHY is well-known. The PHY 20 is typically an integrated circuit. A digital processor (not shown) is coupled to the PHY 20 for processing the data.

The PSE 10 has a similar PHY 26 and AC-coupling capacitors 28 and 30.

The PD 12 includes a capacitor 32 across the PD load 18 for smoothing the voltage across the PD load 18. The capacitor 32 may also provide charge storage for a downstream DC-DC converter. The converter would then convert the incoming voltage to a regulated voltage for another portion of the PD load.

DC-coupling inductors L1-L4 pass the DC voltage and block the differential data signals.

One technique for measuring the overall resistance of the DC power path between the PSE 10 and PD 12 is as follows. Prior to the PSE 10 supplying full DC power to the PD 12, the PSE 10 applies a low current pulse of a known magnitude (e.g., 15 mA) to the wire 14 using a current source 38. The PD load 18 detects the pulse, via buffer 40 and pin P1, and temporarily closes the MOSFET M1 switch to effectively short the ends of the inductors L3 and L4 together. A reverse-blocking diode 42 ensures that current does not flow through the MOSFET M1 body diode when the MOSFET M1 is off.

The PSE logic circuit 44 then measures the voltage across its pins 46 and 48 and uses the known value of the current pulse to determine the resistance of the DC power path, using Ohm's law, through all components in the current loop. A buffer 49 at the pin 46 is optional. By knowing the actual resistance of the DC power path, the power dissipated by the DC power path for any PD current can be determined, and the PSE power budget can be adjusted accordingly.

The PD 12 can also detect the voltage V1 by sensing the voltage across its pins P1 and P2, but the voltage includes the voltage drop across the inductors L3 and L4.

After the resistance testing routine, and any low power handshaking routines between the PSE 10 and the PD 12, a power switch 50 is closed to supply the full PSE voltage VPSE across the wires 14 and 16 to power the PD 12.

A MOSFET M2 in the PSE 10 can be used to provide a reset signal to the PD 12. This reset signal is also used in the Serial Communication and Classification Protocol (SCCP) as specified in the IEEE standards.

One drawback of this technique is that the full current by the current source 38 flows through the PD inductors L3 and L4. This results in voltage drops across the inductors L3 and L4 due to the DC resistance (DCR) of the coils. Therefore, this technique causes inaccuracy in the measured resistance of the wires 14 and 16.

Another technique is depicted in FIG. 2, where the resistance of the wires 14 and 16 is more accurately measured. In this technique, two additional pins, P4 and P5, are added to the PD load 54 to detect the voltage V2 on the line-side of the inductors L3 and L4 so the voltage drop across the inductors L3 and L4 does not affect the voltage measurement by the PD load 54.

The PD 12 may measure the voltage across the wires 14 and 16 using an analog-to-digital converter. The measured voltage is then transmitted, as an 8-bit code, back to the PSE 10. The PSE 10 then calculates the detected voltage across the wires and uses the known current pulse to calculate the resistance of the wires 14 and 16 using Ohm's law. Thus, the calculated resistance of the wires 14 and 16 using this technique is more accurate compared to using the technique of FIG. 1.

A drawback in the technique of FIG. 2 is that two extra pins P4 and P5 and their connections need to be added to measure the voltage across the wires 14 and 16 at the PD 12. This adds cost and complexity.

Accordingly, what is needed is a technique that more accurately measures the resistance of conductors between a PSE and a PD which does not require additional pins and connections in the PD.

SUMMARY

In a system where DC power and differential data are supplied over the same conductors, a low-power test is first performed to determine the conductor resistance. The PSE and PD are connected to the conductors via DC-coupling inductors that block the data signals. Such inductors have a DC resistance (DCR). To avoid the DCR of the PD inductors being included in the resistance test of the conductors, the PD includes a MOSFET switch connected across the conductors on the line-side of the PD inductors.

To test the conductor resistance, the PSE applies a current pulse of a known value to one of the conductors while the MOSFET switch is temporarily closed. The current flows through both conductors as an injection path and return path. Since the MOSFET is connected on the line-side of the PD inductors, the current does not flow through the PD inductors, so the DCR of the PD inductors does not drop any voltage.

The PSE may determine the conductor resistance in two ways. In a first way, the PSE detects the resulting voltage across the conductors and, using the known current level, applies Ohm's law to determine the resistance of the loop. It is assumed that the voltage dropped across the MOSFET at the PD is either negligible or low enough with low enough variation that it can be assumed to be a fixed predetermined value. Since the DCRs of the PD inductors are not in the loop, the calculated resistance is closer to the actual resistance of the conductors, compared to the calculated resistance of the loop using the circuit of FIG. 1.

In a second way, the PD measures the resulting voltage between the "positive" and reference or "negative" voltage conductor and converts the voltage level to a low frequency data signal. The PD then transmits the voltage level to the PSE, which then determines the resistance of the conductors using Ohm's law. The low frequency data signals can pass through the DC-coupling inductors without substantial attenuation. Since very little current flows through the PD's DC-coupling inductors (due to the closed MOSFET being on the line-side of the inductors), there is negligible voltage drop across the inductors, so the measured voltage level of the conductor is accurate.

Accordingly, a more accurate measurement of the resistance of the conductors is achieved since the current pulse does not flow through the PD's DC-coupling inductors. No extra pins are required for kelvin sensing the voltage. The resistance measurement can be used to determine the power dissipation and voltage drop by the conductors so a more accurate power budget of the PSE can be determined. If the conductor resistance is low, increased power to the PD may be provided. Further, by knowing the actual voltage drop during operation, the PSE voltage may be adjusted to provide a precise DC voltage to the PD.

The DCR of the PSE-side inductors may be known by the PSE logic, and such resistance may be taken into account when calculating the actual resistance of the conductors.

The same test routine may be used with the present invention as is used with the prior art, yet the accuracy of the resistance measurement is improved at no additional cost.

After the low power test for conductor resistance and after any other low power handshaking routine between the PSE and the PD, the PSE closes a power switch to apply the full DC voltage across the conductors to power the PD.

The invention is also applicable to Power over Ethernet (PoE) systems where a first wire pair conducts a positive DC voltage and a second wire pair conducts a reference voltage.

Other embodiments are described.

DETAILED DESCRIPTION OF THE EMBODIMENTS

FIG. 1 illustrates a prior art PoDL circuit for measuring the resistance of conductors between a PSE and a PD.

FIG. 2 illustrates another prior art PoDL circuit for measuring the resistance of conductors between a PSE and a PD.

FIG. 5 illustrates a PoDL circuit, in accordance with another embodiment of the invention, for measuring the resistance of conductors between a PSE and a PD.

FIG. 6 illustrates a PoDL circuit, in accordance with another embodiment of the invention, for measuring the resistance of conductors between a PSE and a PD.

FIG. 7 illustrates a PoDL circuit, in accordance with another embodiment of the invention, for measuring the resistance of conductors between a PSE and a PD.

FIG. 8 illustrates a PoDL circuit, in accordance with another embodiment of the invention, for measuring the resistance of conductors between a PSE and a PD.

Elements that are the same or equivalent are labelled with the same numeral.

DETAILED DESCRIPTION

Figure 3:
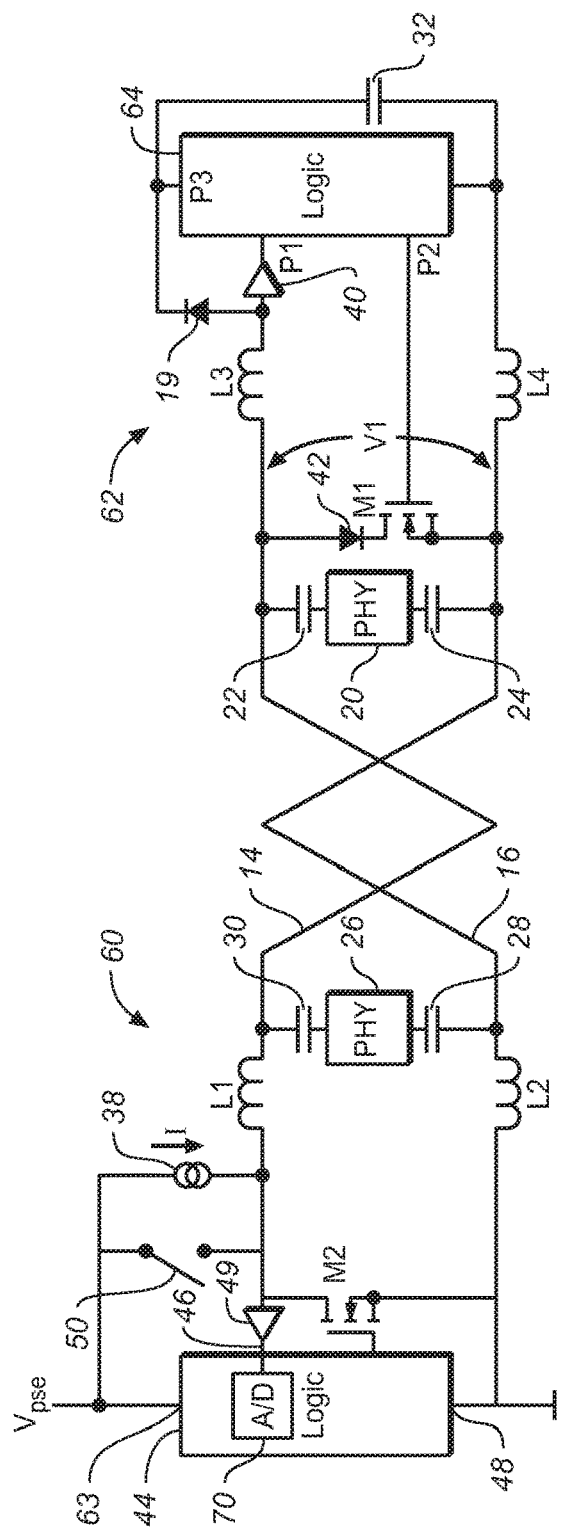
FIG. 3 illustrates a PoDL circuit, in accordance with one embodiment of the invention, for measuring the resistance of conductors between a PSE and a PD.

FIG. 3 illustrates one embodiment of the invention. FIG. 3 shows a PoDL system, where a PSE 60 supplies DC power to a PD 62 via the wires 14 and 16, and the PSE 60 and PD 62 also communicate using differential data signals via the wires 14 and 16. A DC voltage source (not shown) is connected to a positive voltage terminal 63 and the ground pin 48 of the PSE logic circuit 44 and supplies the voltage VPSE to the PSE 60. Prior to fully powering the PD 62, the PSE 60 and PD 62 may first perform a low power handshaking routine that ensures the PD 62 is PoDL compatible and which identifies to the PSE 60 the power requirements of the PD 62.

During this low power initial phase, the PSE 60 also detects the approximate resistance of the wires 14 and 16, which is the subject of the present invention. Instead of the twisted wire pair, a shielded cable may be used.

FIG. 3 shows the wires 14 and 16 coupled to the PD load 64 (which includes a logic circuit) for powering the load 64. Although the PD's PHY 20 is also powered by the DC voltage provided by the PSE 60, the power connections to the PHY 20 are not shown for simplicity. A voltage converter (not shown) in the load 64 may be used to convert the DC voltage on the wires 14 and 16 to a suitable voltage for the load 64 and the PHY 20.

During the low power conductor resistance test, the load 64 and other PD components are powered by a low current pulse (e.g., 15 mA) provided by the PSE 60 as described below.

One difference between the circuit of FIG. 3 and the circuit of FIG. 1 is that the MOSFET M1 is connected on the line-side of the DC-coupling inductors L3 and L4. The MOSFET M1 is controlled by the logic circuit in the PD load 64 during the resistance test phase. When the MOSFET M1 is closed, there is a current loop from the PSE 60 that includes the inductors L1 and L2, the wires 14 and 16, the diode 42, and the closed MOSFET M1. The PD inductors L3 and L4 are not in the current loop. The diode 42 prevents a reverse current through the body diode of the MOSFET M1 when the MOSFET M1 is in an open state.

Figure 4:
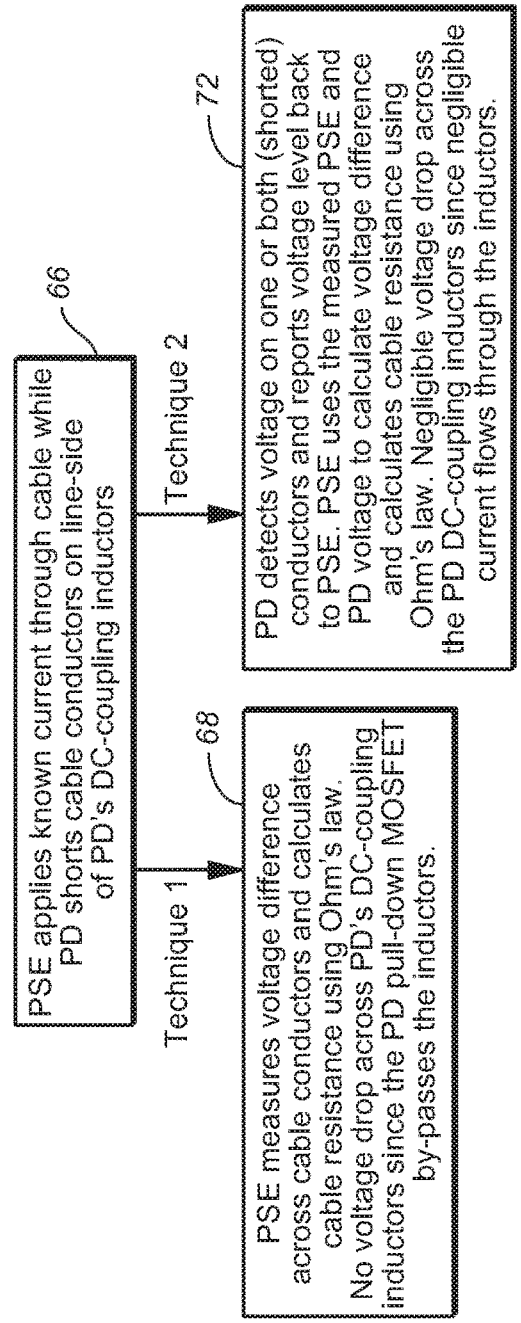
FIG. 4 is a flowchart describing the operation of the circuit of FIG. 3.

The flowchart of FIG. 4 is referenced in the below description of the operation of the circuit of FIG. 3. The PSE 60 may first generate a reset pulse by temporarily turning on the MOSFET M2. The MOSFET M2 can also be used for SCCP signaling. The MOSFET M2 can also be moved to the line side of the inductors L1 and L2 to allow tighter SCCP signaling thresholds.

In step 66 of FIG. 4, after the reset, the PSE 60 activates the current source 38 to supply a current pulse of a known low magnitude to the wire 14. The pulse may be between 9 mA and 16 mA, which can be the sourced current's limits for SCCP used in the type of PoDL system so as to reuse the design blocks already present.

The current supplied to the PD load 64 charges the capacitor 32 across the load 64, which powers the logic circuitry in the load 64. The logic circuitry detects the current pulse and, in response, temporarily turns on the MOSFET M1. Now there is a low resistance path through inductor L1, wire 14, the forward biased diode 42, the MOSFET M1, the wire 16, and the inductor L2. The PSE MOSFET M2 is open at this time.

In step 68, the PSE logic circuit 44 then measures the resulting voltage across its pins 46 and 48 (the ends of the current loop) using an analog-to-digital converter 70 to generate an n-bit code, where n is determined by the required accuracy, design complexity of the converter 70, etc. The PSE logic circuit 44 now knows the current level of the pulse and the resulting voltage across the pins 46 and 48. The logic circuit 44 then calculates the resistance between the pins 46 and 48 using Ohm's law. The PSE 60 may also measure the current. In this technique, the DCRs of the inductors L3 and L4 are not in the loop, so the calculated resistance value of the wires 14 and 16 is more accurate than that calculated in the circuit of FIG. 1. If the PSE knows the DC resistance of its inductors L1 and L2, then this value can be subtracted for an even greater accuracy.

The resulting resistance may be used by the PSE 60 to calculate any voltage drop during operation or be used to more accurately adjust the PSE power budget. If the resistance is lower than that assumed by the IEEE standards, the power to the PD 62 may be increased. A more precise voltage level may also be supplied to the PD 62 to obviate the need for a voltage converter in the PD 62. The cable length may also be increased based on the maximum allowable resistance, or longest allowed link delay, or highest allowed link insertion loss.

Using this technique, the same prior art routine of FIG. 1 may be used for detecting the resistance of the conductors, but the measurement is more accurate.

After the various low power tests, the PSE logic 44 closes the switch 50 (and deactivates the current source 38) to supply the full DC voltage across the wires 14 and 16 to power the PD 62 for normal operation.

In another embodiment, the current source 38 is not physically separate from the switch 50, and the switch 50 temporarily acts as a fixed current source. In such an embodiment, the switch 50 is operated as a fixed, constant current switch during the low current resistance test procedure and then operated as a standard closed switch in the full power operating mode. One type of fixed current switch uses a low value series resistor, or a sample cell in the switch itself, for measuring current. The current is then compared to the target current in a feedback loop for maintaining the switch's current at the target current for the duration of the current pulse. After the resistance test, the switch 50 is closed with a "full" control voltage applied to its control terminal. The powered PHYs 20 and 26 may then begin communication using differential data across the wires 14 and 16.

In the alternative technique of step 72 in FIG. 4, the PD 62 detects the voltage across the pins P1 and P2 and converts this voltage level to an n-bit code using an analog-to-digital converter in the PD load 64. The PD 62 then transmits this code to the PSE 60, which then calculates the approximate resistance of the wires 14 and 16 within the current loop, using Ohm's law, for use by the PSE 60 in adjusting the power budget, etc. Since the n-bit code can have a low data rate, the data is not blocked by the DC-coupling inductors L1-L4. Since there is negligible current flowing through the PD inductors L3, L4 due to the closed MOSFET M1, there is essentially no voltage drop across the inductors L3, L4 so the voltage measurement is accurate. No extra pins are used for the measurement, in contrast to the circuit of FIG. 2.

FIG. 5 is identical to FIG. 3 except that the MOSFET M1 is coupled to the wires 14 and 16 via magnetically coupled windings 76 and 78. For some applications and data speeds, the parasitic capacitance of the MOSFET M1 and diode 42 might cause deterioration of the return loss. In FIG. 5, the coupled windings 76 and 78 may be coupled inductors, a common mode choke (CMC), a differential mode choke (DMC) added in series with the MOSFET M1 to improve the return loss. The windings 76 and 78 may even be uncoupled inductors.

FIG. 6 shows similar coupled windings 80 and 82 in series with the PSE MOSFET M2 for performing the same function at the PSE end.

In FIG. 7, the blocking diode 42 of FIG. 3 is replaced by another MOSFET M3 to eliminate the voltage drop by the blocking diode 42. The MOSFETs M1 and M3 are opened at the same time or closed at the same time. The conductor resistance measurement is further improved. For a very low resistance short by MOSFETs M1 and M3, the voltage at the pins P1 and P2 is equal so there is no need for a voltage measurement at the PD 64.

In FIG. 8, common mode chokes (CMCs) 84 and 86 are added at the wire terminations to attenuate common mode noise and thus improve data integrity.

Any combinations of the features of the various figures may be combined to realize the various advantages described herein.

Although the terms PoDL and PoE are used herein to describe a system that conducts data and DC power over the same wires, the terms PoDL and PoE are not intended to limit the invention to any specific embodiment such as defined by the IEEE or other standard. Similarly, the term PHY is not meant to be limited by any IEEE standard or definition and may broadly include any suitable transceiver.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power over Data Lines (PoDL) circuit including Power Sourcing Equipment (PSE) for supplying DC power to a Powered Device (PD) over a first conductor and a second conductor, the PoDL circuit comprising:
    the PD comprising:
        a PD load powered by a DC voltage coupled across the first conductor and the second conductor;
        a first DC-coupling inductor coupled between the first conductor and the PD load;
        a second DC-coupling inductor coupled between the second conductor and the PD load;
        a first switch, controlled by the PD, coupled across the first conductor and the second conductor, the first switch being controllable for temporarily creating a low resistance path between the first conductor and the second conductor;
    the PSE comprising:
        a current source for supplying a current pulse to the first conductor so that the current pulse flows through a loop including the first conductor, the first switch, and the second conductor without flowing through the first DC-coupling inductor and the second DC-coupling inductor; and
        PSE logic circuitry configured for calculating a resistance of the loop using a level of the current pulse and a voltage on at least one of the first conductor and the second conductor.

2. The circuit of claim 1 wherein the PSE logic circuitry measures the voltage at the first conductor and uses a known value of the current pulse to calculate the resistance of the loop using Ohm's law.

3. The circuit of claim 1 wherein the PD load measures a voltage level across the first conductor and the second conductor and transmits the voltage level to the PSE, and the PSE uses the value of the current pulse to determine the resistance of the loop using Ohm's law.

4. The circuit of claim 1 further comprising a diode between the first switch and the first conductor.

5. The circuit of claim 1 wherein the first switch comprises a first MOSFET.

6. The circuit of claim 1 wherein the first switch comprises a first MOSFET in series with a diode.

7. The circuit of claim 1 wherein the first switch comprises a first MOSFET in series with a second MOSFET.

8. The circuit of claim 1 wherein the first switch comprises a first MOSFET, wherein
    a first inductor is connected in series between the first MOSFET and the first conductor; and
    a second inductor is connected in series between the first MOSFET and the second conductor.

9. The circuit of claim 8 wherein the first inductor and the second inductor are magnetically coupled.

10. The circuit of claim 1 further comprising at least one common mode choke (CMC) in series with the first conductor and the second conductor.

11. The circuit of claim 1 further comprising a second switch in the PSE, the second switch being closed after the PSE logic circuitry calculates the resistance of the loop to supply a full DC voltage to the PD to power the PD.

12. The circuit of claim 1 wherein the PSE logic circuitry is configured for calculating a voltage drop across the first conductor and the second conductor.

13. The circuit of claim 1 further comprising a first transceiver in the PD coupled across the first conductor and the second conductor for receiving and transmitting differential data from and to the PSE.

14. The circuit of claim 1 wherein the current source comprises a controllable switch that is controlled in a first mode to conduct the current pulse at a constant first current level, and controlled in a second mode to supply a full DC voltage to the PD to power the PD.

15. A method performed by a Power over Data Lines (PoDL) circuit including Power Sourcing Equipment (PSE) for supplying DC power to a Powered Device (PD) over a first conductor and a second conductor, the method comprising:
    powering a PD load by a DC voltage coupled across the first conductor and the second conductor, the DC voltage being conducted through a first DC-coupling inductor coupled between the first conductor and the PD load and conducted through a second DC-coupling inductor coupled between the second conductor and the PD load;
    prior to powering the PD load by the DC voltage, closing a first switch, coupled across the first conductor and the second conductor, for temporarily creating a low resistance path between the first conductor and the second conductor;
    supplying a current pulse, by the PSE, to the first conductor so that the current pulse flows through a loop including the first conductor, the first switch, and the second conductor without flowing through the first DC-coupling inductor and the second DC-coupling inductor; and
    calculating a resistance of the loop using a level of the current pulse and a voltage on at least one of the first conductor and the second conductor.

16. The method of claim 15 wherein the step of calculating the resistance of the loop comprises measuring the voltage at the first conductor and using a known value of the current pulse to calculate the resistance of the loop using Ohm's law.

17. The method of claim 15 further comprising:
    the PD load measuring a voltage level of the first conductor and transmitting the voltage level to the PSE; and
    the PSE using the value of the current pulse to determine the resistance of the loop using Ohm's law.

18. The method of claim 15 wherein the first switch comprises a first MOSFET.

19. The method of claim 15 wherein the first switch comprises a first MOSFET in series with a diode.

20. The method of claim 15 wherein the first switch comprises a first MOSFET in series with a second MOSFET.

21. The method of claim 15 wherein the first switch comprises a first MOSFET, wherein
    a first inductor is connected in series between the first MOSFET and the first conductor; and
    a second inductor is connected in series between the first MOSFET and the second conductor.

* * * * *